(12) United States Patent
Nakamoto et al.

(10) Patent No.: US 10,305,145 B2
(45) Date of Patent: May 28, 2019

(54) LIQUID ELECTROLYTE FOR FLUORIDE ION BATTERY AND FLUORIDE ION BATTERY

(71) Applicants: Hirofumi Nakamoto, Kyoto (JP); Zempachi Ogumi, Kyoto (JP); Jun-ichi Yamaki, Kyoto (JP)

(72) Inventors: Hirofumi Nakamoto, Kyoto (JP); Zempachi Ogumi, Kyoto (JP); Jun-ichi Yamaki, Kyoto (JP)

(73) Assignees: TOYOTA JIDOSHA KABUSHIKI KAISHA, Toyota (JP); KYOTO UNIVERSITY, Kyoto-Fu (JP)

( * ) Notice: Subject to any disclaimer, the term of this patent is extended or adjusted under 35 U.S.C. 154(b) by 287 days.

(21) Appl. No.: 15/124,220

(22) PCT Filed: Jan. 19, 2015

(86) PCT No.: PCT/JP2015/051939
§ 371 (c)(1),
(2) Date: Sep. 7, 2016

(87) PCT Pub. No.: WO2015/146265
PCT Pub. Date: Oct. 1, 2015

(65) Prior Publication Data
US 2017/0018795 A1    Jan. 19, 2017

(30) Foreign Application Priority Data
Mar. 28, 2014   (JP) ................... 2014-068553

(51) Int. Cl.
*H01M 10/0568* (2010.01)
*H01M 10/05* (2010.01)
(Continued)

(52) U.S. Cl.
CPC ....... *H01M 10/0568* (2013.01); *H01M 6/164* (2013.01); *H01M 6/166* (2013.01);
(Continued)

(58) Field of Classification Search
CPC ......... H01M 10/0568; H01M 10/0569; H01M 10/05; H01M 6/164; H01M 6/166;
(Continued)

(56) References Cited

U.S. PATENT DOCUMENTS

2011/0143219 A1    6/2011    Weiss et al.
2011/0151317 A1    6/2011    Giroud et al.
(Continued)

FOREIGN PATENT DOCUMENTS

CN    103450498    * 12/2013
JP    2004-134165   * 4/2004
(Continued)

*Primary Examiner* — Laura Weiner
(74) *Attorney, Agent, or Firm* — Oliff PLC

(57) ABSTRACT

The problem to be solved is to provide a liquid electrolyte for a fluoride ion battery which allows a larger capacity of the battery. Solving the problem by providing a liquid electrolyte for a fluoride ion battery including a fluoride salt and a solvent to dissolve the fluoride salt, characterized in that the solvent is an aromatic material having an aromatic cation and an anion, and a molar ratio of the aromatic cation to a fluoride ion is more than 1.

12 Claims, 5 Drawing Sheets

(51) Int. Cl.
  *H01M 10/0569* (2010.01)
  *H01M 6/16* (2006.01)
  *H01M 4/58* (2010.01)
  *H01M 4/583* (2010.01)

(52) U.S. Cl.
  CPC ....... *H01M 10/05* (2013.01); *H01M 10/0569* (2013.01); *H01M 4/582* (2013.01); *H01M 4/583* (2013.01); *H01M 2220/20* (2013.01); *H01M 2300/0034* (2013.01); *H01M 2300/0045* (2013.01)

(58) Field of Classification Search
  CPC .. H01M 4/582; H01M 4/583; H01M 2220/20; H01M 2300/0034; H01M 2300/0045
  See application file for complete search history.

(56) References Cited

U.S. PATENT DOCUMENTS

| | | |
|---|---|---|
| 2012/0164541 A1 | 6/2012 | Darolles et al. |
| 2014/0004429 A1 | 1/2014 | Nakanishi |

FOREIGN PATENT DOCUMENTS

| | | |
|---|---|---|
| JP | 2004-362872 A | 12/2004 |
| JP | 2009-529222 A | 8/2009 |
| JP | 2010-267446 A | 11/2010 |
| JP | 2011-527495 A | 10/2011 |
| JP | 2013-251091 A | 12/2013 |
| JP | 2014-501434 A | 1/2014 |
| WO | 2007-146453 A2 | 12/2007 |
| WO | 2011-077939 A1 | 6/2011 |

\* cited by examiner

LIQUID ELECTROLYTE FOR FLUORIDE ION BATTERY AND FLUORIDE ION BATTERY

TECHNICAL FIELD

The present invention relates to a liquid electrolyte for a fluoride ion battery which allows a larger capacity of the battery.

BACKGROUND ART

For example, an Li ion battery is known as a high-voltage and high-energy density battery. The Li ion battery is a cation-based battery utilizing a reaction between an Li ion and a cathode active material and a reaction between an Li ion and an anode active material. On the other hand, a fluoride ion battery utilizing a reaction of a fluoride ion is known as an anion-based battery. For example, in Patent Literature 1, a fluoride ion battery provided with an electrolyte containing an anode, a cathode and a fluoride salt, and a predetermined additive is disclosed.

In Patent Literature 1, it is described that an ionic liquid is used as a solvent of a liquid electrolyte, and 1-methyl,1-propylpiperidinium(MPP)cation, butyltrimethylammonium (BTMA)cation and 1-butyl,1-methylpyrrolidinium(BMP) cation are described as a cation of the ionic liquid. Incidentally, any of these cations does not correspond to an aromatic cation.

CITATION LIST

Patent Literature

Patent Literature 1: US 2012/0164541

SUMMARY OF INVENTION

Technical Problem

The problem is that a fluoride ion is so low in stability that activity for fluoridating an active material is low. In other words, the problem is that a fluoride ion is so high in reactivity as to be incapable of sufficiently reacting with an active material by reason of reacting with another material (particularly a liquid electrolyte) before reacting with an active material. Thus, it is difficult to intend a larger capacity of a battery.

The present invention has been made in view of the actual circumstances, and the main object thereof is to provide a liquid electrolyte for a fluoride ion battery which allows a larger capacity of the battery.

Solution to Problem

In order to achieve the problems, the present invention provides a liquid electrolyte for a fluoride ion battery comprising a fluoride salt and a solvent to dissolve the fluoride salt, characterized in that the solvent is an aromatic material having an aromatic cation and an anion, and a molar ratio of the aromatic cation to a fluoride ion is more than 1.

According to the present invention, the use of the aromatic material as the solvent allows the improvement of activity for fluoridating an active material and a liquid electrolyte for a fluoride ion battery which allows a larger capacity of the battery.

In the invention, the aromatic material is preferably an ionic liquid.

In the invention, the aromatic cation is preferably a cation represented by the following general formula.

In the general formula, $R^1$ to $R^6$ are each independently hydrogen, an alkyl group or a fluoroalkyl group.

[Chemical Formula 1]

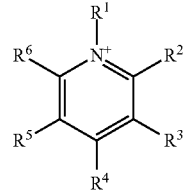

In the invention, the anion of the aromatic material is preferably bisfluorosulfonylamide(FSA)anion.

Also, the present invention provides a fluoride ion battery comprising a cathode active material layer, an anode active material layer, and an electrolyte layer formed between the cathode active material layer and the anode active material layer, characterized in that the electrolyte layer contains the liquid electrolyte for a fluoride ion battery described above.

According to the present invention, the use of the liquid electrolyte for a fluoride ion battery described above allows the fluoride ion battery with a large capacity.

Advantageous Effects of Invention

A liquid electrolyte for a fluoride ion battery of the present invention produces the effect such as to allow a larger capacity of the battery.

DESCRIPTION OF EMBODIMENTS

A liquid electrolyte for a fluoride ion battery and a fluoride ion battery of the present invention are hereinafter described in detail.

A. Liquid Electrolyte for Fluoride Ion Battery

The liquid electrolyte for a fluoride ion battery of the present invention comprises a fluoride salt and a solvent to dissolve the fluoride salt, characterized in that the solvent is an aromatic material having an aromatic cation and an anion, and a molar ratio of the aromatic cation to a fluoride ion is more than 1.

According to the present invention, the use of the aromatic material as the solvent allows the improvement of activity for fluoridating an active material and a liquid electrolyte for a fluoride ion battery which allows a larger capacity of the battery. The reason why activity for fluoridating an active material may be improved is assumed to be as follows.

Figure 1:
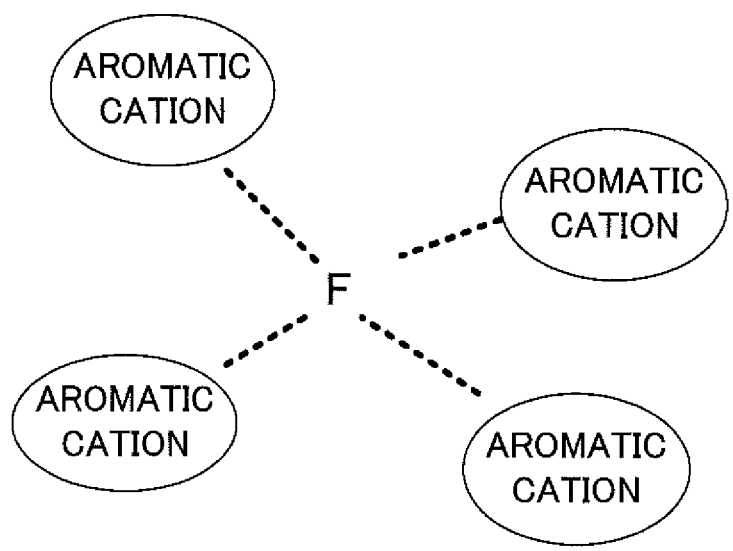
FIG. 1 is a schematic view explaining an estimation mechanism in the present invention.

That is to say, as shown in FIG. 1, the use of the aromatic material as the solvent allows plural aromatic cations to be disposed so as to surround a single fluoride ion (F⁻). The aromatic cation interacts easily with the fluoride ion by reason of having electron-withdrawing as a cation. On the other hand, the aromatic cation does not excessively bond to (react with) the fluoride ion by reason of having the charge dispersion effect by aromaticity. It is guessed that such an interaction allows stability of the fluoride ion to be improved. Also, the aromatic cation forms a stacking structure by aromaticity, so that the fluoride ion moves easily and it is guessed that this point also allows activity for fluoridating an active material to be improved.

Also, in the present invention, stability of the fluoride ion is improved, so as to allow the effect of improving coulombic efficiency and the effect of being capable of restraining the production of hydrofluoric acid (HF).

The liquid electrolyte for a fluoride ion battery of the present invention is hereinafter described in each constitution.

1. Solvent

In the present invention, the aromatic material having an aromatic cation and an anion is used as the solvent. The aromatic material is not particularly limited if the material is a material having an aromatic cation; above all, preferably an ionic liquid. The reason therefor is that volatility is low. The ionic liquid in the present invention signifies a material with a melting point of 100° C. or less. Above all, the melting point of the ionic liquid is preferably 50° C. or less, and more preferably 25° C. or less. Also, the aromatic material is ordinarily a nonprotic material. The fluoride ion reacts with a proton to produce hydrofluoric acid, so that a nonprotic material is used for the solvent. That is to say, the solvent in the present invention is a material which does not react with F⁻, or a material which produces a substantial battery reaction even in reacting with F⁻.

The aromatic cation is not particularly limited if the cation is such as to have aromaticity. The aromatic cation ordinarily has a ring structure. The ring structure may be a five-membered ring, a six-membered ring or a seven-membered ring. The ring structure is preferably a heteroring structure. A heteroelement in the heteroring structure is preferably nitrogen.

Examples of the aromatic cation include pyridinium cation and imidazolium cation.

Examples of the pyridinium cation include a cation represented by the following general formula.

[Chemical Formula 2]

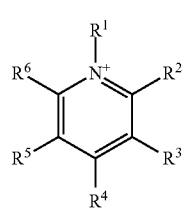

In the general formula, $R^1$ to $R^6$ are each independently hydrogen, an alkyl group or a fluoroalkyl group. In the case where $R^1$ to $R^6$ are an alkyl group or a fluoroalkyl group, the carbon number thereof is, for example, 10 or less, preferably 6 or less, and more preferably 4 or less. Also, $R^1$ is preferably an alkyl group or a fluoroalkyl group. $R^2$ to $R^6$ are preferably hydrogen, an alkyl group or a fluoroalkyl group with a carbon number of 3 or less.

Examples of the imidazolium cation include a cation represented by the following general formula.

[Chemical Formula 3]

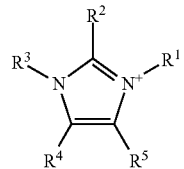

In the general formula, $R^1$ to $R^5$ are each independently hydrogen, an alkyl group or a fluoroalkyl group. In the case where $R^1$ to $R^5$ are an alkyl group or a fluoroalkyl group, the carbon number thereof is, for example, 10 or less, preferably 6 or less, and more preferably 4 or less. Also, $R^1$ is preferably an alkyl group or a fluoroalkyl group. $R^2$ to $R^5$ are preferably hydrogen, an alkyl group or a fluoroalkyl group with a carbon number of 3 or less.

On the other hand, the anion of the aromatic material does not react basically with the fluoride ion by reason of electrically repelling the fluoride ion. Thus, kinds of the anion of the aromatic material are not particularly limited. Examples of the anion of the aromatic material include amide anions typified by bisfluorosulfonylamide(FSA)anion and bistrifluoromethanesulfonylamide(TFSA)anion, phosphate anions typified by hexafluorophosphate anion and tris(pentafluoroethyl)trifluorophosphate anion, tetrafluoroborate(TFB)anion, and triflate anion. Above all, the anion of the aromatic material is preferably FSA anion. The reason therefor is that an oxidation current value in CV measurement is remarkably high. The reason why the oxidation current value becomes remarkably high is guessed to be that the size of an anion structure is appropriate for forming a stacking structure of the aromatic cation.

The solvent used for the present invention contains at least the aromatic material described above. The solvent used for the present invention may be only the aromatic material or a mixture of the aromatic material and another solvent. The ratio of the aromatic material to all solvents is, for example, 50 mol % or more, preferably 60 mol % or more, more preferably 70 mol % or more, far more preferably 80 mol % or more, and particularly preferably 90 mol % or more.

A general nonaqueous solvent may be used as another solvent; specific examples thereof include ethylene carbonate (EC), fluoroethylene carbonate (FEC), difluoroethylene carbonate (DFEC), propylene carbonate (PC), dimethyl carbonate (DMC), diethyl carbonate (DEC), ethyl methyl carbonate (EMC), butylene carbonate (BC), γ-butyrolactone, sulfolane, acetonitrile, 1,2-dimethoxymethane, 1,3-dimethoxypropane, diethyl ether, tetrahydrofuran, 2-methyltetrahydrofuran, dimethyl sulfoxide (DMSO), and optional mixtures thereof.

2. Fluoride Salt

The fluoride salt in the present invention is not particularly limited if the salt is such as to produce the fluoride ion which reacts with an active material, but may be an organic fluoride salt or an inorganic fluoride salt. Also, the fluoride salt may be an ionic liquid.

A cation of the fluoride salt is not particularly limited but examples thereof include a complex cation. Examples of the complex cation include alkylammonium cation, alkylphosphonium cation and alkylsulfonium cation. Examples of the alkylammonium cation include a cation represented by the following general formula.

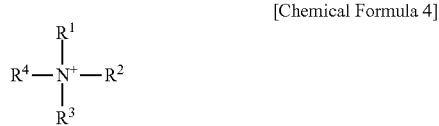

[Chemical Formula 4]

In the general formula, $R^1$ to $R^4$ are each independently an alkyl group or a fluoroalkyl group. The carbon number of $R^1$ to $R^4$ is, for example, 10 or less, and may be 5 or less or 3 or less.

An anion of the fluoride salt is not particularly limited if the anion is such as to produce the fluoride ion which reacts with an active material, but is preferably $F^-$ above all.

The concentration of the fluoride salt in the liquid electrolyte is, for example, within a range of 0.4 mol % to 45 mol %, and preferably within a range of 0.7 mol % to 10 mol %.

3. Liquid Electrolyte for Fluoride Ion Battery

In the present invention, as shown in FIG. 1, the use of the aromatic material as the solvent allows plural aromatic cations to be disposed so as to surround a single fluoride ion ($F^-$). The use of the aromatic material as the solvent allows a molar ratio of the aromatic cation to the fluoride ion contained in the liquid electrolyte to become more than 1. The molar ratio is preferably 5 or more, and more preferably 10 or more. On the other hand, the molar ratio is preferably 200 or less, for example. Also, the molar ratio may be calculated from the concentration of the fluoride ion and the aromatic cation contained in the liquid electrolyte. These concentrations may be obtained from $^{19}F$-NMR and $^{1}H$-NMR, for example.

Incidentally, with regard to $F(HF)_x^-$ anion, $F^-$ dissociates from HF with difficulty. Thus, an active material is occasionally fluorinated sufficiently with difficulty. Incidentally, "x" is a larger number (resistance, impedance) than 0 and satisfies $0 < x \leq 5$, for example. Thus, it is preferable that the liquid electrolyte for a fluoride ion battery does not substantially contain $F(HF)_x^-$ anion. The phrase "not substantially contain $F(HF)_x^-$ anion" signifies that the ratio of $F(HF)_x^-$ anion to all anions existing in the liquid electrolyte is 0.5 mol % or less. The ratio of $F(HF)_x^-$ anion is preferably 0.3 mol % or less.

B. Fluoride Ion Battery

Figure 2:
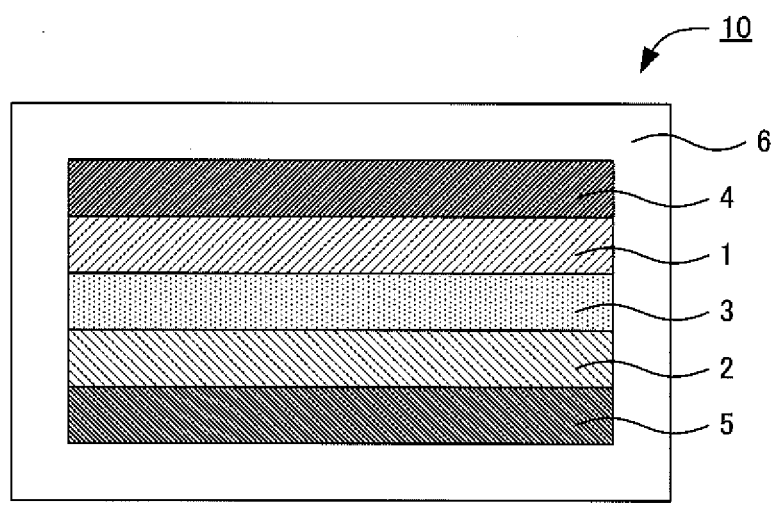
FIG. 2 is a schematic cross-sectional view showing an example of a fluoride ion battery of the present invention.
Figure 3:
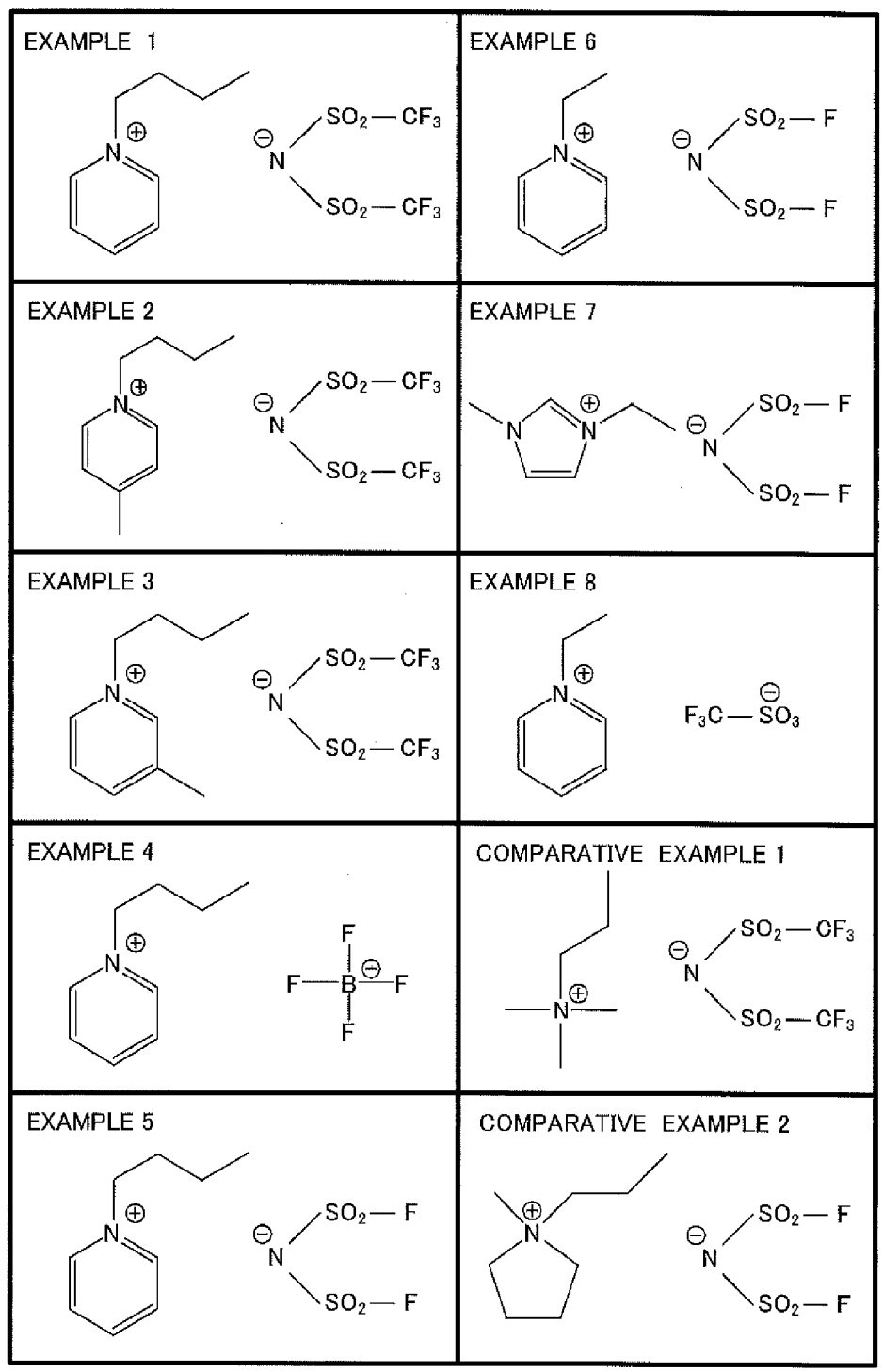
FIG. 3 is a chemical formula of a solvent each used in Examples 1 to 8 and Comparative Examples 1 and 2.

FIG. 2 is a schematic cross-sectional view showing an example of the fluoride ion battery of the present invention. A fluoride ion battery 10 shown in FIG. 2 comprises a cathode active material layer 1, an anode active material layer 2, an electrolyte layer 3 formed between the cathode active material layer 1 and the anode active material layer 2, a cathode current collector 4 for collecting the cathode active material layer 1, an anode current collector 5 for collecting the anode active material layer 2, and a battery case 6 for storing these members. Also, the electrolyte layer 3 contains the "A. Liquid electrolyte for fluoride ion battery".

According to the present invention, the use of the liquid electrolyte for a fluoride ion battery described above allows the fluoride ion battery with a large capacity. The fluoride ion battery of the present invention is hereinafter described in each constitution.

1. Electrolyte Layer

The electrolyte layer in the present invention is a layer formed between the cathode active material layer and the anode active material layer. In the present invention, the electrolyte layer contains the liquid electrolyte for a fluoride ion battery described above. The thickness of the electrolyte layer varies greatly with constitutions of the battery, and is not particularly limited.

2. Cathode Active Material Layer

The cathode active material layer in the present invention is a layer containing at least the cathode active material. Also, the cathode active material layer may further contain at least one of a conductive material and a binder except the cathode active material.

The cathode active material in the present invention is ordinarily an active material which is defluorinated during discharge. Examples of the cathode active material include metal simple substance, alloy, metal oxide, and fluorides thereof. Examples of metallic element contained in the cathode active material include Cu, Ag, Ni, Co, Pb, Ce, Mn, Au, Pt, Rh, V, Os, Ru, Fe, Cr, Bi, Nb, Sb, Ti, Sn and Zn. Above all, the cathode active material is preferably Cu, $CuF_x$, Fe, $FeF_x$, Ag and $AgF_x$. Incidentally, the "x" is a larger number (resistance, impedance) than 0. Cu and $CuF_x$ are high-energy density materials and preferable in that point. Also, other examples of the cathode active material include a carbon material and fluorides thereof. Examples of the carbon material include graphite, coke and carbon nanotube. Also, further examples of the cathode active material include a polymer material. Examples of the polymer material include polyaniline, polypyrrole, polyacetylene and polythiophene.

The conductive material is not particularly limited if the material is such as to have desired electron conductivity, but examples thereof include a carbon material. Examples of the carbon material include carbon black such as acetylene black, Ketjen Black, furnace black and thermal black. On the other hand, the binder is not particularly limited if the binder is such as to be chemically and electrically stable, but examples thereof include fluorine-based binders such as polyvinylidene fluoride (PVDF) and polytetrafluoroethylene (PTFE). Also, the content of the cathode active material in the cathode active material layer is preferably larger from the viewpoint of capacity. Also, the thickness of the cathode active material layer varies greatly with constitutions of the battery, and is not particularly limited.

3. Anode Active Material Layer

The anode active material layer in the present invention is a layer containing at least the anode active material. Also, the anode active material layer may further contain at least one of a conductive material and a binder except the anode active material.

The anode active material in the present invention is ordinarily an active material which is fluorinated during discharge. Also, an optional active material having lower potential than the cathode active material may be selected for the anode active material. Thus, the cathode active material described above may be used as the anode active material. Examples of the anode active material include metal simple substance, alloy, metal oxide, and fluorides thereof. Examples of metallic element contained in the anode active material include La, Ca, Al, Eu, Li, Si, Ge, Sn, In, V, Cd, Cr, Fe, Zn, Ga, Ti, Nb, Mn, Yb, Zr, Sm, Ce, Mg and Pb. Above all, the anode active material is preferably Mg, $MgF_x$, Al, $AlF_x$, Ce, $CeF_x$, Ca, $CaF_x$, Pb and $PbF_x$. Incidentally, the x is a larger number (resistance, impedance) than 0. Also, the carbon material and the polymer material described above may be used as the anode active material.

The same material as the material described in the cathode active material layer may be used for the conductive material and the binder. Also, the content of the anode active material in the anode active material layer is preferably larger from the viewpoint of capacity. Further, the thickness of the anode active material layer varies greatly with constitutions of the battery, and is not particularly limited.

4. Other Constitutions

The fluoride ion battery of the present invention comprises at least the anode active material layer, the cathode active material layer and the electrolyte layer described above, ordinarily further comprising a cathode current collector for collecting the cathode active material layer and an anode current collector for collecting the anode active material layer. Examples of the shape of the current collectors include a foil shape, a mesh shape and a porous shape. Also, the fluoride ion battery of the present invention may have a separator between the cathode active material layer and the anode active material layer. The reason therefor is to allow the battery with higher safety.

5. Fluoride Ion Battery

The fluoride ion battery of the present invention is not particularly limited if the battery is such as to comprise the cathode active material layer, the anode active material layer and the electrolyte layer described above. Also, the fluoride ion battery of the present invention may be a primary battery or a secondary battery, preferably a secondary battery among them. The reason therefor is to be repeatedly charged and discharged and be useful as a car-mounted battery, for example. Also, examples of the shape of the fluoride ion battery of the present invention include a coin shape, a laminate shape, a cylindrical shape and a rectangular shape.

Incidentally, the present invention is not limited to the above-mentioned embodiments. The above-mentioned embodiments are exemplification, and any is included in the technical scope of the present invention if it has substantially the same constitution as the technical idea described in the claim of the present invention and offers similar operation and effect thereto.

EXAMPLES

The present invention is described more specifically while showing examples hereinafter.

Example 1

Tetramethylammonium fluoride (fluoride salt, manufactured by Aldrich) and 1-butylpyridiniumbistrifluoromethanesulfonylamide (solvent, manufactured by KANTO CHEMICAL CO., INC.) were weighed and mixed at a molar ratio of fluoride salt:solvent=1:50. Thereafter, the mixture was stirred in a hermetically sealed vessel made of fluororesin on the conditions of 80° C. and 1 hour to obtain an evaluation liquid electrolyte.

Example 2

An evaluation liquid electrolyte was obtained in the same manner as Example 1 except for using 4-methyl-1-butylpyridiniumbistrifluoromethanesulfonylamide (manufactured by Merck Ltd., Japan) as the solvent.

Example 3

An evaluation liquid electrolyte was obtained in the same manner as Example 1 except for using 3-methyl-1-butylpyridiniumbistrifluoromethanesulfonylamide (manufactured by Merck Ltd., Japan) as the solvent.

Example 4

An evaluation liquid electrolyte was obtained in the same manner as Example 1 except for using 1-butylpyridiniumtetrafluoroborate (manufactured by Merck Ltd., Japan) as the solvent.

Example 5

An evaluation liquid electrolyte was obtained in the same manner as Example 1 except for using 1-butylpyridiniumbisfluorosulfonylamide (manufactured by Merck Ltd., Japan) as the solvent.

Example 6

An evaluation liquid electrolyte was obtained in the same manner as Example 1 except for using 1-ethylpyridiniumbisfluorosulfonylamide (manufactured by KANTO CHEMICAL CO., INC.) as the solvent.

Example 7

An evaluation liquid electrolyte was obtained in the same manner as Example 1 except for using 1-ethyl-3-methylimidazoliumbisfluorosulfonylamide (manufactured by KANTO CHEMICAL CO., INC.) as the solvent.

Example 8

An evaluation liquid electrolyte was obtained in the same manner as Example 1 except for using 1-ethylpyridiniumtriflate (manufactured by IoLiTec (Ionic Liquids Technologies GmbH)) as the solvent.

Comparative Example 1

An evaluation liquid electrolyte was obtained in the same manner as Example 1 except for using N,N,N-trimethyl-N-propylammoniumbistrifluoromethanesulfonyl amide (manufactured by KANTO CHEMICAL CO., INC.) as the solvent.

Comparative Example 2

An evaluation liquid electrolyte was obtained in the same manner as Example 1 except for using N-propyl-N-methyl-pyrrolidiniumbisfluorosulfonylamide (manufactured by KANTO CHEMICAL CO., INC.) as the solvent.

[Evaluations]
(Cyclic Voltammetry Measurement)

CV measurement was performed for the evaluation liquid electrolyte obtained in Examples 1 to 8 and Comparative Examples 1 and 2. Specifically, an evaluation was performed in a glove box under an Ar atmosphere by using a dip three-electrode cell. A Pt plate or a Cu plate was used for a working electrode, and a mixture electrode of PTFE, acetylene black (AB) and fluorocarbon was used for a counter electrode. Incidentally, the mixture electrode is an electrode containing at a weight ratio of PTFE:AB:fluorocarbon=1:2:7. Also, a reference electrode was isolated from the evaluation liquid electrolyte by using Vycor glass. Incidentally, an Ag line immersed in an acetonitrile solution, in which silver nitrate and tetrabutylammonium perchlorate were each dissolved at a concentration of 0.1 M, was used for the reference electrode. Also, the measurement was performed on the conditions of room temperature and a sweep rate of 10 mV/s.

Figure 4:
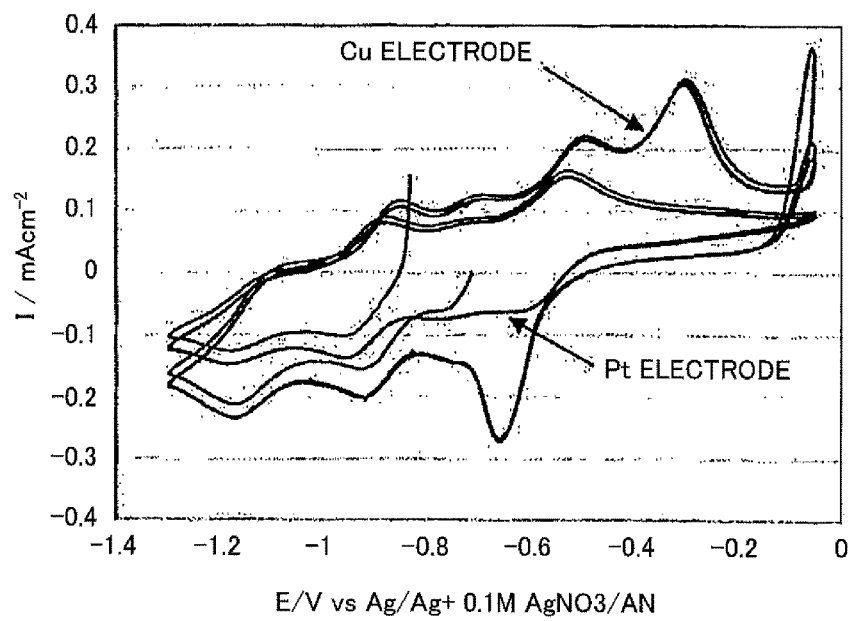
FIG. 4 illustrates a result of CV measurement for an evaluation liquid electrolyte each obtained in Example 5.

FIG. 4 is a result of CV measurement for the evaluation liquid electrolyte obtained in Example 5. As shown in FIG. 4, an oxidation current peak in accordance with fluoridation of copper was confirmed in the vicinity of −0.3 V, and a reduction current peak in accordance with defluoridation of copper fluoride was confirmed in the vicinity of −0.65 V. Also, an oxidation current value is calculated in the following manner. Oxidation current value=(current value of Cu electrode at −0.3 V)−(current value of Pt electrode at −0.3 V) The results of the oxidation current value of the evaluation liquid electrolyte obtained in Examples 1 to 8 and Comparative Examples 1 and 2 are shown in Table 1 and FIGS. 5 to 8.

TABLE 1

|  | OXIDATION CURRENT VALUE (mA/cm$^2$) |
|---|---|
| EXAMPLE 1 | 0.0338 |
| EXAMPLE 2 | 0.0493 |
| EXAMPLE 3 | 0.0551 |
| EXAMPLE 4 | 0.0250 |
| EXAMPLE 5 | 0.2022 |
| EXAMPLE 6 | 0.1167 |
| EXAMPLE 7 | 0.1888 |
| EXAMPLE 8 | 0.0430 |
| COMPARATIVE EXAMPLE 1 | 0.0075 |
| COMPARATIVE EXAMPLE 2 | 0.0107 |

Figure 5:
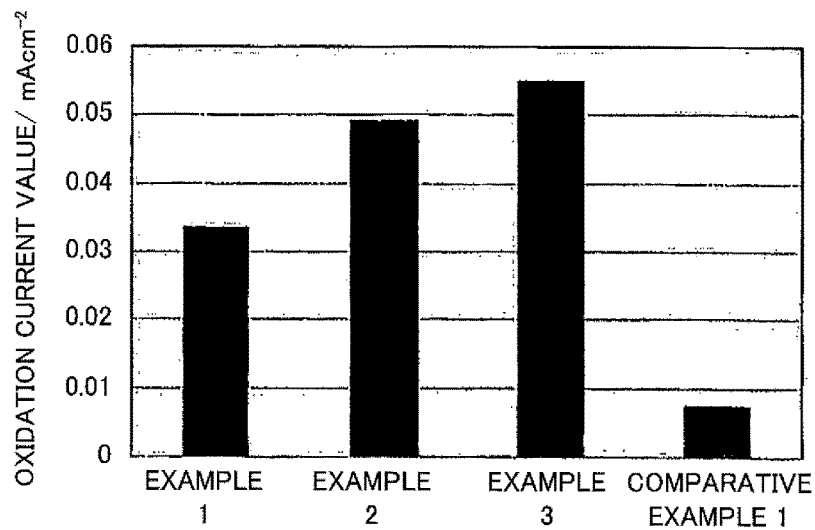
FIG. 5 illustrates an oxidation current value of an evaluation liquid electrolyte each obtained in Examples 1 to 3 and Comparative Example 1.
Figure 6:
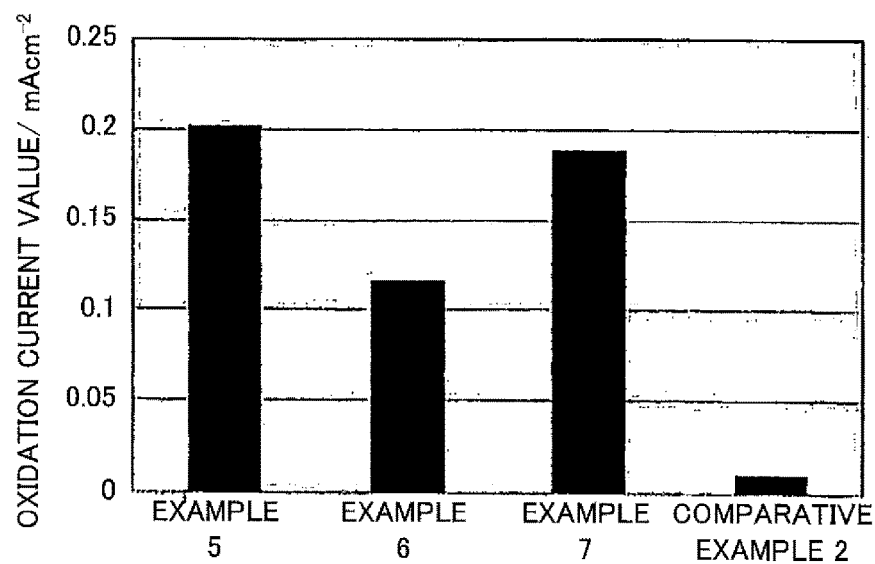
FIG. 6 illustrates an oxidation current value of an evaluation liquid electrolyte each obtained in Examples 5 to 7 and Comparative Example 2.

In FIG. 5, when Examples 1 to 3 were compared with Comparative Example 1, in the case of using a solvent containing an aromatic cation, it was confirmed that the oxidation current value was greatly large. Similarly, in FIG. 6, when Examples 5 to 7 were compared with Comparative Example 2, in the case of using a solvent containing an aromatic cation, it was confirmed that the oxidation current value was greatly large. Thus, in the case of using a solvent containing an aromatic cation, it was confirmed that fluoridation of an active material was easily caused to allow a larger capacity of the battery.

Figure 7:
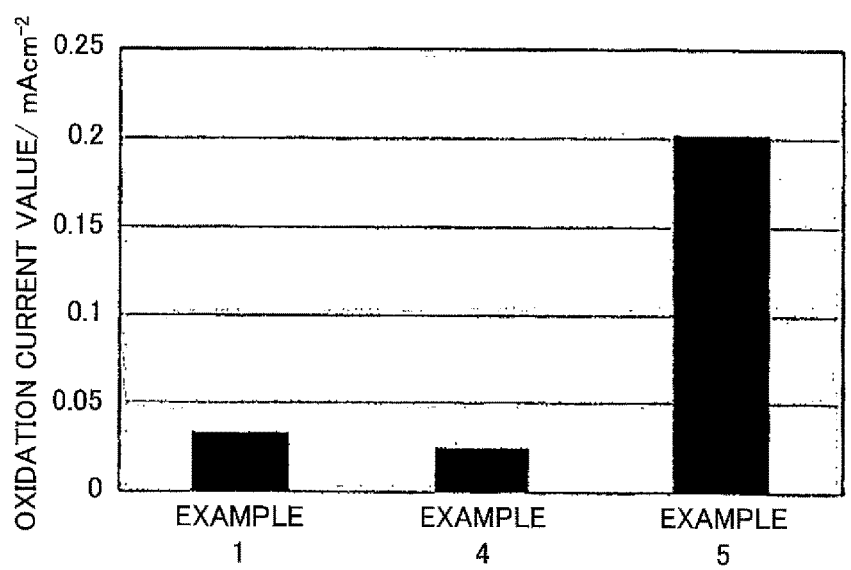
FIG. 7 illustrates an oxidation current value of an evaluation liquid electrolyte each obtained in Examples 1, 4 and 5.
Figure 8:
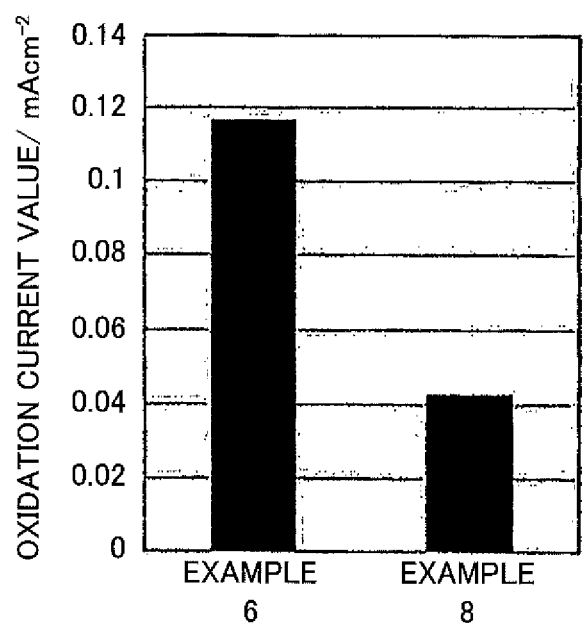
FIG. 8 illustrates an oxidation current value of an evaluation liquid electrolyte each obtained in Examples 6 and 8.

Also, in FIG. 7, when Examples 1, 4 and 5 were compared, in the case of using a solvent containing an FSA anion, the oxidation current value became remarkably large. Similarly, in FIG. 8, when Examples 6 and 8 were compared, in the case of using a solvent containing an FSA anion, the oxidation current value became remarkably large. On the other hand, like Comparative Example 2 in FIG. 6, the oxidation current value was low in a combination of a cation, which is not an aromatic cation, and an FSA anion. It was confirmed from this fact that a combination of an aromatic cation and an FSA anion produced a synergistic effect and improved the oxidation current value drastically. In particular, it was also suggested that a combination of a pyridinium cation and an FSA anion was preferable.

REFERENCE SIGNS LIST

1 Cathode active material layer
2 Anode active material layer
3 Electrolyte layer
4 Cathode current collector
5 Anode current collector
6 Battery case
10 Fluoride ion battery

The invention claimed is:

1. A fluoride ion battery comprising a cathode active material layer containing a cathode active material, an anode active material layer containing an anode active material, and an electrolyte layer formed between the cathode active material layer and the anode active material layer, wherein
the electrolyte layer comprises a liquid electrolyte,
the liquid electrolyte comprises a fluoride salt and a solvent to dissolve the fluoride salt,
the solvent contains at least an aromatic material having an aromatic cation and an anion,
a molar ratio of the aromatic cation to a fluoride ion is more than 1,
the cathode active material is an active material which is defluoridated during discharge, and
the anode active material is an active material which is fluoridated during discharge.

2. The fluoride ion battery according to claim 1, wherein the aromatic material is an ionic liquid.

3. The fluoride ion battery according to claim 1, wherein the aromatic cation is a cation represented by the following general formula:

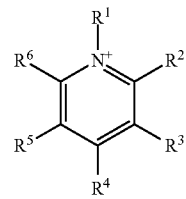

[Chemical Formula 1]

in the formula, $R^1$ to $R^6$ being each independently hydrogen, an alkyl group or a fluoroalkyl group.

4. The fluoride ion battery according to claim 1, wherein the anion of the aromatic material is bisfluorosulfonylamide (FSA)anion.

5. The fluoride ion battery according to claim 1, wherein a proportion of F(HF)x-anion to all anions existing in the liquid electrolyte is 0.5 mol % or less, including 0 mol %.

6. The fluoride ion battery according to claim 1, wherein the fluoride salt has F$^-$ anion.

7. The fluoride ion battery according to claim 1, wherein the fluoride salt has a complex cation.

8. The fluoride ion battery according to claim 7, wherein the complex cation is selected from the group consisting of an alkylammonium cation, an alkylphosphonium cation and an alkylsulfonium cation.

9. The fluoride ion battery according to claim 1, wherein the fluoride salt is present in a concentration of 0.4 mol % to 45 mol % in the liquid electrolyte.

10. The fluoride ion battery according to claim 1, wherein the fluoride salt is present in a concentration of 0.7 mol % to 10 mol % in the liquid electrolyte.

11. The fluoride ion battery according to claim 1, wherein the molar ratio of the aromatic cation to a fluoride ion is 5 or more and no more than 200.

12. The fluoride ion battery according to claim 1, wherein the molar ratio of the aromatic cation to a fluoride ion is 10 or more and no more than 200.

* * * * *